Dec. 4, 1973　　　　　H. LA MERS　　　　　3,776,801
LABELING APPARATUS

Original Filed Aug. 30, 1968　　　　　7 Sheets-Sheet 1

Dec. 4, 1973  H. LA MERS  3,776,801
LABELING APPARATUS

Original Filed Aug. 30, 1968  7 Sheets-Sheet 2

United States Patent Office 3,776,801
Patented Dec. 4, 1973

3,776,801
LABELING APPARATUS
Herbert La Mers, Los Angeles, Calif., assignor to
R. A. Jones & Company, Inc.
Original application Aug. 30, 1968, Ser. No. 756,651, now Patent No. 3,661,625. Divided and this application Nov. 13, 1970, Ser. No. 89,492
Int. Cl. B32b 31/18
U.S. Cl. 156—350                              19 Claims

ABSTRACT OF THE DISCLOSURE

Apparatus for applying labels to goods comprising an elongated web with labels spaced therealong and supported within the web, and means for transporting said web to a first station where glue is applied to the labels and to another station where the labels are punched out of the web and pressed against the goods.

This application is a divisional of U.S. patent application Ser. No. 756,651, filed Aug. 30, 1968 and now U.S. Pat. No. 3,661,625. Reference is made to my co-pending related application Ser. No. 186,138 filed Oct. 4, 1971.

BACKGROUND OF THE INVENTION

Field of the invention

This invention relates to apparatus for applying labels to goods.

Description of the prior art

The high speeds of modern packaging lines have surpassed the labeling capabilities of all but the very largest and most expensive labeling machinery. In addition to the disadvantage of high costs, such machines have generally been specialized in function so that change-over to different label or package sizes and shapes has been costly. This has limited the usefulness of the machinery and to a certain extent discouraged variety in packaging and labeling.

The storage and handling of labels has also been less than satisfactory. Labels are often handled in stacks. The handling of individual labels in stacks is awkward and has limited the speed and efficiency of label application to the goods.

OBJECTS AND SUMMARY OF THE INVENTION

One object of the invention is to provide label applying apparatus which is compact, economical, readily convertible for use with a variety of label sizes and shapes, and capable of high speed operation.

Another object of the invention is to provide a labeling system which permits the handling of a wide variety of label shapes in rolls.

Still another object of the invention is to provide a labeling system for the novel and efficient application of hot melt adhesives to labels.

In accordance with the present invention, a labeling system is provided for the high speed application of labels to goods. The system includes an elongated web such as a strip of paper, with labels printed serially along the center area. The system also includes apparatus for applying or activating glue on one side of a label, detaching the label from the rest of the web, and applying the label to the goods. The web is moved past the machine station where the labels receive glue or glue activation and the station where they are detached and applied, by pulling the web remnant which remains after the labels are detached.

In one embodiment of the invention, the label comprises a roll of plain paper with labels printed therealong. Each label is die-cut from the surrounding web remnant except for small bridges which are left to hold the label in place, and the edge portions of the web have sprocket hole areas. The roll of web is held on a supply reel and it extends along a web path past a glue applying station, a label affixing station, and a sprocket wheel, to a take-up reel.

At the glue applying station, a web lifter moves a label area against a glue applicator head whose surface is covered with glue. The applicator head has the shape of the glue pattern desired to be applied to the label. This prevents the application of glue to the web remnant, which would hamper its handling by the sprocket wheel and thereafter. The applicator head is porous and is heated, so that hot glue can be easily forced through it for application to the label.

At the label affixing station, a plunger is thrust through the web to detach the label, which now carries tacky glue, and to apply it directly to the goods. The plunger carrier pins which pierce the label prior to its detachment from the surrounding web, to prevent shifting of the label position on the plunger during detachment. The plunger continues to move forward after label detachment to carry the label to the goods and press it thereon. Near the end of forward plunger movement, the pins are withdrawn to prevent damage to the goods.

The web is moved intermittently past the glue applying station and label affixing station by the sprocket wheel. The sprocket wheel, which is rotated intermittently, engages the sprocket hole areas at the edges of the web remanent to pull the web along. A loop of web is formed between the supply reel and the glue applying station to permit rapid stepping of the web along its path without tearing or requiring a correspondingly high intermittent unwinding of the supply reel. A vacuum chamber forms the loop of the web, and also applies a constant tension to the web.

The foregoing and other novel features of the invention are set forth with particularity in the appended claims. The invention will be best understood from the following description, when read in conjunction with the accompanying drawings.

DESCRIPTION OF THE PREFERRED EMBODIMENTS

Figure 1:
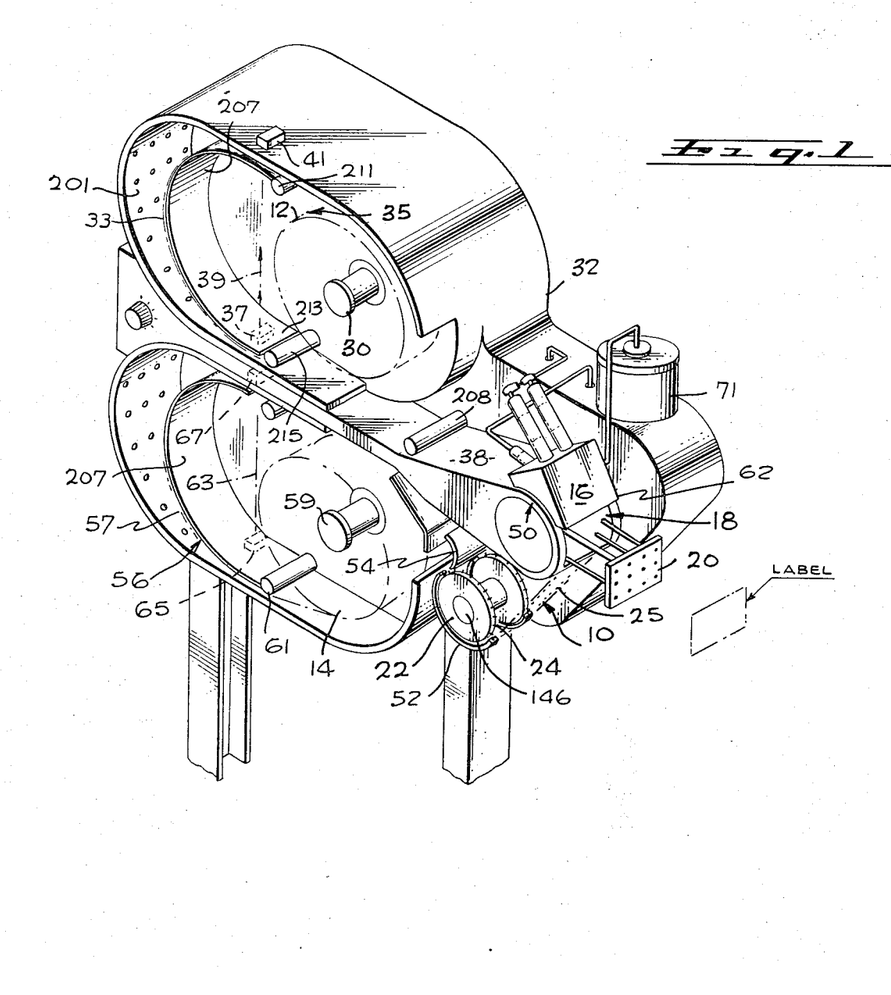
FIG. 1 is a perspective view of labeling apparatus constructed in accordance with the invention.

The labeling apparatus shown in FIG. 1 moves a web 10, on which labels have been printed, from a supply reel 12, along a web path to a take-up reel 14. The web passes a glue applying station 16, where glue is applied to the back of each label area. It then moves to a label affixing station 18, positioned downpath from the glue applying station, where a plunger 20 passes through the web to punch out a label and apply it to goods (not shown). The web waste or remnant, which is left after the labels have been punched out, passes around a sprocket wheel 22. The sprocket wheel has sprockets 24 which enter sprocket holes 25 formed along each edge of the web. These sprocket holes lie outside the label areas so that they are present in the web remnant. The sprocket wheel is rotated intermittently to pull the web in steps along the portion of the web path extending past the glue applying and label affixing stations 16 and 18.

The supply reel 12 that holds the web, is fixed to a shaft 30. The shaft 30 is rotatably mounted on a machine frame 32, and is driven intermittently to unwind the web. The rotation of the shaft 30 is closely controlled to maintain a loop 33 of web of proper size within a web supply chamber 35. A light source 37 shines a beam of light 39 along a path that crosses the supply chamber, to a photocell 41. When the loop 33 grows too small, so that it no longer interrupts the beam 39, the photocell 41 senses this. The supply reel shaft 30 is then coupled to a motor to unwind the reel until a sufficiently large loop 33 has been formed. A vacuum is maintained on the side of the loop 33 has been formed. A vacuum is maintained on the side of the loop 33 opposite the reel, to keep the web in a loop configuration. A more complete description of the supply reel unwinding apparatus will be given below.

The web which passes out of the supply chamber 35 moves along a guide rail 38 to an annular frame portion 50. The gluing station 16 and label affixing station 18 are positioned along the frame portion 50. The web remnant which is left after label areas have been removed, passes to the sprocket wheel 22. A collector 52 is positioned on one side of the sprocket wheel to force the engagement of the web with the sprocket wheel. A plow 54, positioned on the opposite side of the sprocket wheel, helps to remove the web from the sprockets and allow the web to pass into a take-up chamber 56.

In the take-up chamber 56, the web remnant is formed in a loop 57, which leads to the take-up reel 14. The take-up reel is mounted on a shaft 59 whose rotation is controlled in a manner similar to that of the supply reel shaft, to maintain the take-up loop at a proper size. The web remnant gathered on the take-up reel is generally discarded.

Figure 2:
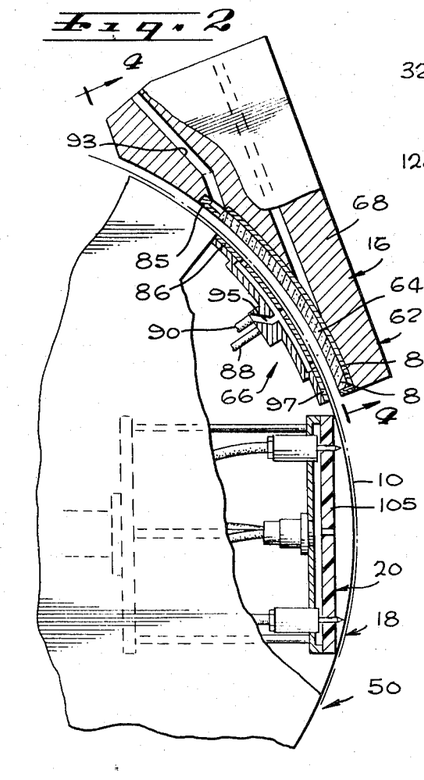
FIG. 2 is a sectional side elevational view of a portion of the apparatus of FIG. 1, showing the gluing and label affixing stations thereof.

FIG. 2 illustrates the areas of the annular frame portion 50 along which are located the gluing station 16 and the label affixing station 18. The gluing station includes a glue applicator 62 having a head assembly 64 for passing glue to the web 10. A web lifter 66 opposite the applicator head moves the web against the head. When the web is against the head, glue flows through the head to provide a layer of glue on a label area of the web.

Figure 3:
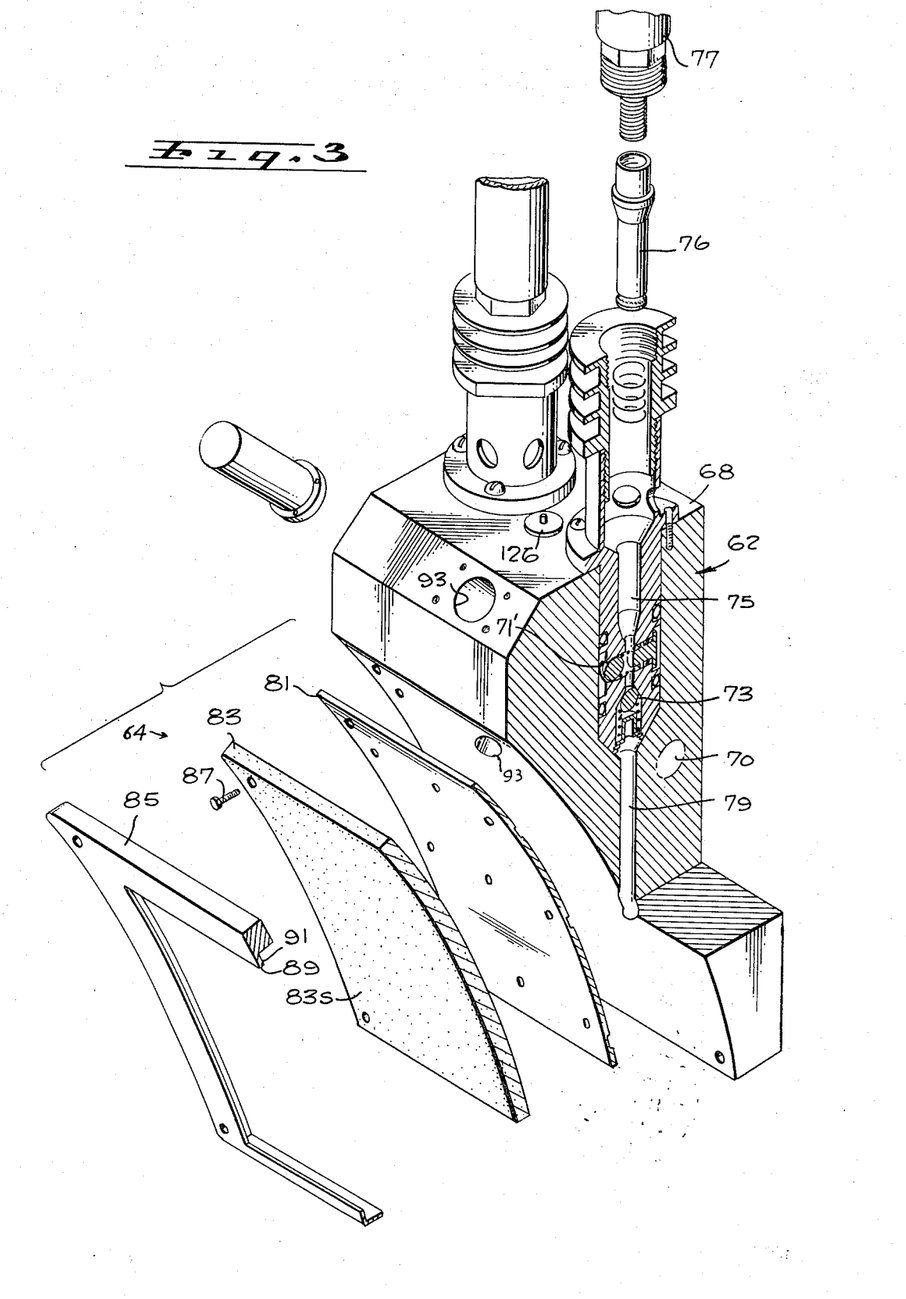
FIG. 3 is an exploded perspective view of the glue application apparatus of FIG. 2.

As also shown in FIG. 3, the applicator 62 comprises a body 68 which receives a continuous supply of heated glue under pressure through a glue input passage 70 from a tank (shown at 71 in FIG. 1). A heater element 126 maintains the applicator body at an elevated temperature to keep the glue in a fluid state. The glue flows through an entrance 71' and an intake check valve and fills a pump chamber 75. A piston 76 which is coupled to an air cylinder 77 can be moved down to force glue which is in the chamber 75 through an exhaust valve 73. The glue then flows through a passageway 79 to the applicator head 64 for application to the web. The air cylinder 77 is operated in synchronism with movement of the label areas past the glue applying station, with a single piston stroke supplying all of the glue applied to each label. The amount of movement of the piston 76 is controlled to supply a predetermined volume of glue to each label. The piston stroke is adjustable so that any desired quantity of glue can be applied. Thus, it can provide the proper amount of glue for small or large labels. The control of piston travel at each stroke enables accurate metering of glue regardless of the speed of operation of the apparatus.

The applicator head 64 comprises a distributor plate 81 with laterally extending channels which distribute the glue from the passageway 79 to each general area of the distributor plate. An application plate 83 of fine porous metal, such as sintered bronze, is positioned forward of the distributor plate to further distribute the glue and to control its flow. When heated, the glue readily passes through the porous material. The thermally conductive nature of the application plate material enables it to conduct heat from the applicator body, so that the glue in the pores does not cool. A frame plate 85 surrounds the applicator plate 83 and distributor plate 81. The applicator plate 83 is held to the body 68 by a series of screws, such as that shown on 87, so that the entire applicator plate glue applying surface 83 projects through the aperture 89 in the frame plate. Accordingly, the entire applicator plate surface is exposed to apply glue to a label which is lifted thereagainst.

The applicator plate 83 has a shape which corresponds to the pattern of glue to be applied to the label. Generally, the entire rear face of the label receives glue, so the applicator plate has the same shape as the label. The waste areas of the web, which surround each label area, are not covered by the applicator head, and therefore they do not receive glue. This facilitates handling of the web remnant after the labels are removed.

It is found that the heated porous-metal applicator plate 83 of the applicator head enables "clean" removal of the web. That is, when the web lifter withdraws the web, the glue on the label separates from the glue on the applicator plate in a zone immediately adjacent to the applicator plate. If this did not occur, then a cobweb of glue would connect the withdrawn web with the glue applicator. Separation of the glue portions at a zone near the applicator head is necessary because of the short distance, such as one-eighth inch, of the fully retracted web lifter from the applicator.

The frame plate 85 has a recess 91 which forms a gutter at the periphery of the glue applying surface. Excess glue, which might otherwise drip on the machinery, collects in the gutter and is drawn off through a vacuum aperture 93. The vacuum aperature 93 is coupled to a vacuum source (not shown) for recirculation of the excess glue to the glue holding container. Of course, the excess glue can be discarded if desired.

The web lifter 66, shown in FIG. 2, which is positioned opposite the applicator head comprises a platform 86 attached to a pneumatically operated piston 88. The lifter platform 86 has a central aperture 95 that is coupled to a vacuum line 90. The aperture 95 extends through a resilient frame portion 97 of the lifter platform to apply a vacuum to the web. This vacuum holds the web tight against the lifter platform and away from the applicator head 64. When gluing is to be performed, the pneumatic piston 88 moves the platform toward the applicator head 64. This brings the web against the head 64, allowing glue from the applicator to flow onto the web. Then the lifter platform is retracted, the vacuum serving to withdraw the web with the platform. The web passes around the annular frame portion, with the front side which bears label indicia facing the lifter platform, and with the back side facing the applicator head 64.

Figure 4:
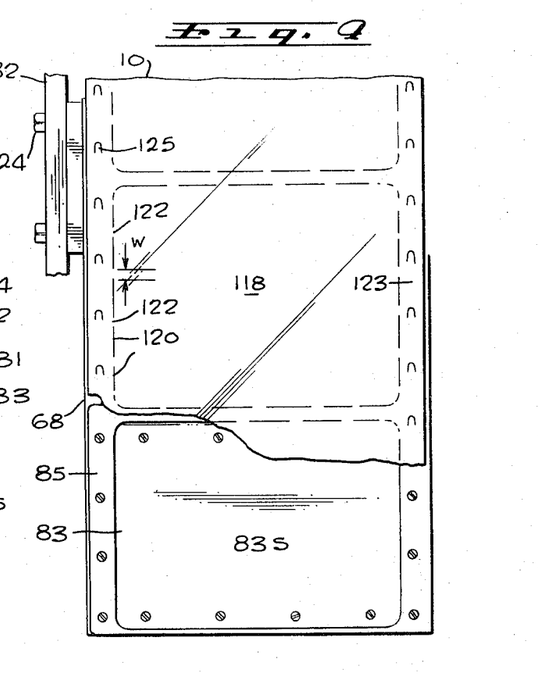
FIG. 4 is a partial front elevation view taken on the lines 4—4 of FIG. 2.

FIG. 4 is a view of the glue applicator 62 taken on the line 4—4 of FIG. 2, this view also showing a portion of the web 10. The applicator is attached to the machine frame 32 by bolts 124. The bolts 124 project through curved slots (not shown) in the machine frame, and can be tightened to hold the applicator in position. The curved slots allow the applicator to be moved to various positions over the annular frame portion 50. This allows the applicator to be used for labels having different spacings from each other along the length of the web. Different size applicator heads 64 can be used to apply glue to smaller labels of round or other shapes. This is done by replacing the head 64 with a head shaped to the form and size of the new label, to mate with it. In those cases where the glue pattern does not cover the entire label area, the head is mated to whatever pattern is applied.

The label affixing station 18 shown in FIG. 2 includes a plunger 20 for affixing labels to the goods. The center of a plunger 20 is located downpath from the center of the glue applicator head 64, by a distance equal to the center-to-center distance between one or another integral (whole) number of labels on the web. This allows a label to move into position over the applicator head at the same time as another label moves over the plunger. At the same time as glue is applied to a label area, the plunger 20 is driven through the web to remove and affix a label. The label area in front of the plunger 20 is an area which has previously received a coating of glue at the gluing station 16. The plunger 20 is guided by slide bearings and is driven by a crankshaft for rapid movement through the web to detach a label therefrom.

Figure 5:
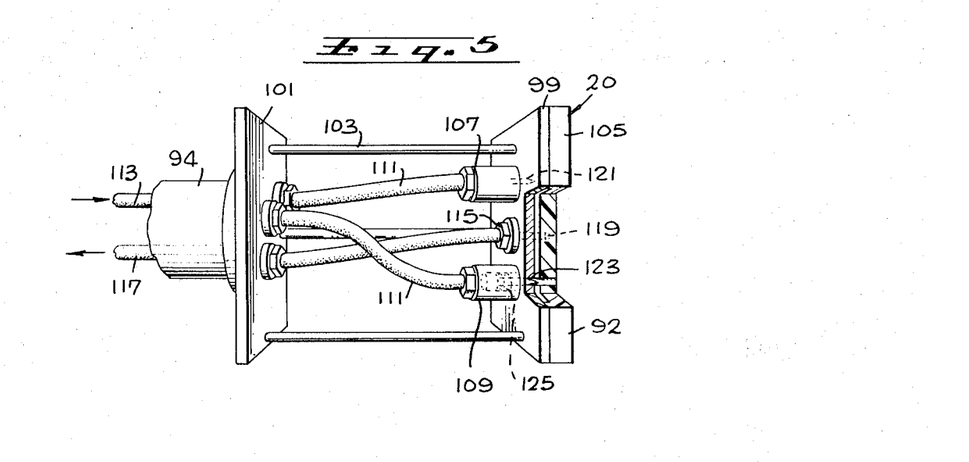
FIG. 5 is a perspective view of the plunger apparatus of FIG. 2.

FIG. 5 is a more detailed view of the plunger 20 of the label affixing station. The plunger comprises a head 92 that includes a front plate 99 and rear plate 101 tied together by four rods 103. A crankshaft-operated piston 94 reciprocates the plunger head to move it through the web and return it to its initial position. The front plate 99 is covered by a layer 105 of elastomeric material such as soft rubber. Both the plate 99 and the covering layer 105 are of the same shape as a label area, to facilitate the detachment of a label as the plunger moves through the web.

A pair of pin cartridges 107 and 109 are mounted on the front plate 99. The cartridges contain pins 121 and 123 that can be extended to pierce the label and thereby stabilize or fix its position on the plunger head. The pin cartridges are coupled by tubes 111 to a pneumatic line 113 that extends through the piston 94. A vacuum fitting 115 is also mounted on the front plate 99. A vacuum line 117 which extends through the piston 94, is connected to the vacuum fitting 115. The vacuum fitting creates a partial pressure at a central aperture 119 in the covering layer 105, to aid in positioning a label against the plunger face.

Immediately prior to the forward movement of the plunger through the web, air pressure is applied through line 113 to the pin cartridges 107 and 109 to project the pins therein past the forward surface of the covering layer 105. The piston 94 is then thrust forward to move the entire plunger head through the web. The first portions of the head to contact the web are the pins 121 and 123, which pierce the web. The head 92 then punches out the label area from the web and carries it toward the object to be labeled. Just prior to reaching the object, the air pulse to the pin cartridges is removed, to enable return springs 125 to retract the pins. When the plunger reaches the object to be labeled, the soft rubber presses substantially evenly on all areas of the label, and with a minimum of shock to the object. The plunger then retracts back to its initial position.

The vacuum applied through the line 117 to the vacuum fitting 115 is first applied as the plunger starts its forward motion through the web. The vacuum is relieved only when the plunger head reaches the object to be labeled, at the end of its forward stroke. The vacuum helps to maintain the label in position on the plunger head, particularly when the pins are retracted.

The action of the plunger 20 is designed to reliably remove a label area from the web and apply it accurately to the object to be labeled. The pins 121 and 123 prevent shifting, while the rapid movement of the plunger 20 through the web provides a clean detachment. The rest of the web around the label area being detached is held in place partially by the tautness of the web and by the clamping of the web between the web lifter 66 and the glue applicator head 64. In addition, wind pressure on the web tends to hold the surrounding web area in place when the label is punched out.

While a piston operated plunger can be used to detach the label and move it to the goods, a variety of other types of apparatus can be used. For example, a bellows-operated plunger can move through the web, or a blast of air can be used to detach a label from the surrounding web. Furthermore, instead of directly applying the label to the goods, an intermediate delivery system can be used. For example, a revolving cylinder or moving belt can be used so that a label removed from the web is carried by a wheel or belt and then transferred to the product or goods.

The web 10, which is shown in FIG. 4, is prepared with die-cuts on the border of each label area, to facilitate separation of the labels from the rest of the web. The web is a strip of paper which is non-adhesive on both sides. Each label area 118 is defined by a plurality of cuts 120 which form a closed curve that encircles the label area. Each cut extends through the entire thickness of the web, and the ends of the cuts are spaced from each other to form bridges 122, each of a width W. The areas 123 at the edges of the web and outside of the label areas, have sprocket hole areas 125 spaced uniformly along the length of the web. The sprocket hole areas are formed by U-shaped cuts in the web, which form tabs or flaps within the cuts. The tabs are pushed aside by sprockets on the sprocket wheel 22, which is located downpath from the gluing and label affixing stations, to engage the web remnant. This enables positive engagement of the sprocket wheel with the web to facilitate pulling it, and to prevent slippage which might result in the label areas not being positioned precisely opposite the glue applicator head and the plunger head.

Both sets of cuts 125 which define the label sprocket areas can be formed by die-cutting the web. Instead of forming U-shaped cuts for the sprockets, holes can be formed, or even notches which can be engaged by appropriately constructed sprocket wheels. Another alternative is to provide means for advancing the web which does not precisely fix the web position, such as a pair of friction rollers, and to provide indexing marks for controlling the intermittent advancement of the rollers or other advancing means. One method, to be described in detail eliminates the need for auxiliary sprocket areas or indexing marks by utilizing the areas from which labels have been removed, to control intermittent web advancement.

Figure 6:
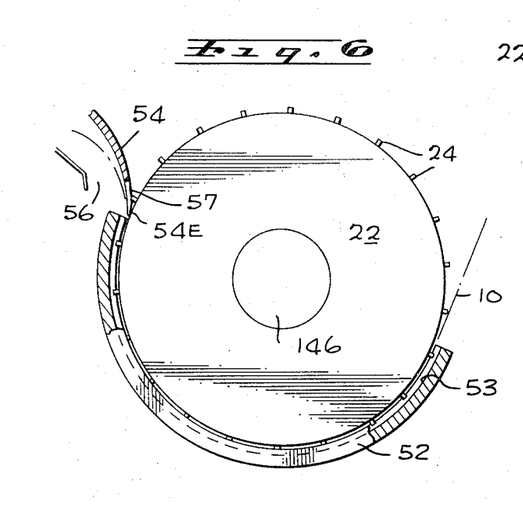
FIG. 6 is a side elevational view of the sprocket wheel of FIG. 1.
Figure 7:
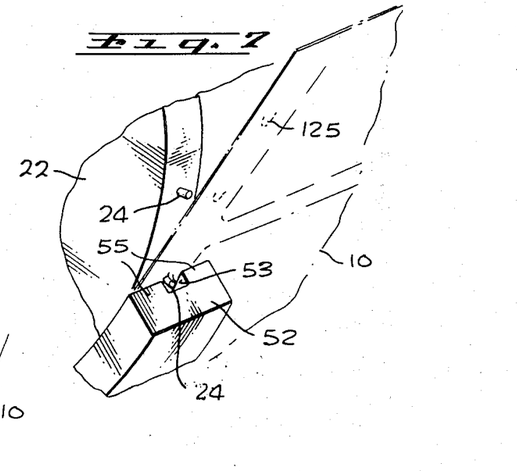
FIG. 7 is a partial perspective view of the spocket wheel of FIG. 6.

FIGS. 6 and 7 show the sprocket wheel 22 which is mounted on a hub 146. The sprocket wheel turns intermittently to advance the web intermittently. The wheel has a plurality of sprockets 24 for engaging the U-shaped sprocket areas 125 of the web remnant, to punch them out and leave only tabs thereon. A collector 52 is disposed adjacent to the sprocket wheel at the area where the web first enters on the wheel. The collector has a groove 53 which closely surrounds the sprockets. The portions 55 on either side of the groove press the edges of the web remnant toward the wheel to force the sprockets 24 into the U-shaped sprocket hole areas. The collector also prevents accidental removal of the web from the sprocket wheel when the machine is stopped. The collector extends approximately half way around the wheel to a plow 54, at which point the web leaves the wheel. The plow 54 serves as a wedge to dislodge the web from wheel. The leading edge 54E of the plow lies against the sprocket wheel, except for a narrow slot 57 in the plow that allows the sprockets to pass by. After removal from the sprocket wheel, the web enters a chute 56 for movement to the take-up chamber and take-up reel therein.

Figure 8:
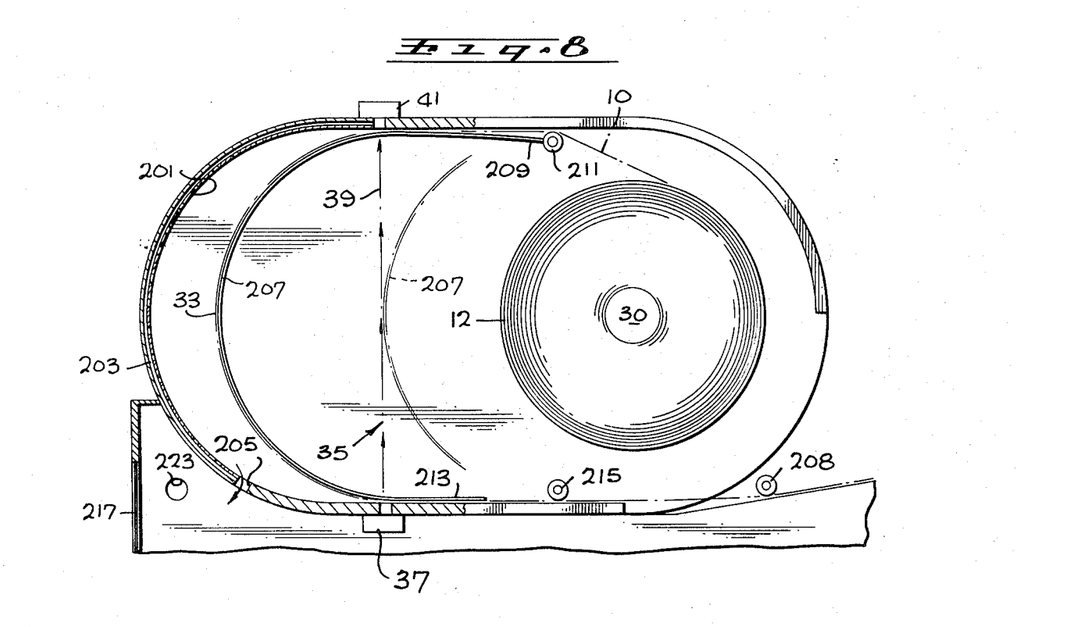
FIG. 8 is a sectional side elevation view of the supply reel apparatus of FIG. 1.

FIG. 8 illustrates the supply chamber 35 which controls the removal of web from the supply reel 12. A perforated plate 201 spaced from the frame forms a passageway 203 between itself and the frame. The passageway 203 is coupled through an aperture 205 to a vacuum line opening 223 that supplies a vacuum or partial pressure. The vacuum or partial pressure that is communicated through the perforations in the plate 201 tends to draw the web into a supply loop 33. A curtain 207 is provided to maintain the web in the loop configuration. The curtain 207 is a strip of thin flexible material such as 0.005 inch thick sheet of nylon, which is drawn by the vacuum and which presses against the web to maintain it as a loop.

The up-path end 209 of the curtain is fixed to a post 211, while the opposite end 213 is free. While the web alone might be maintained as a loop, the curtain is generally necessary. The curtain seals the web area where cuts are made that form the label and sprocket areas, and fills out the full width of the supply chamber when the web is narrower than the chamber. In addition, the curtain serves as an optically "solid" or opaque light target to interrupt the light beam 39. When the photocell 41 detects the light beam 39, the supply shaft is turned to increase the size of the supply loop 33.

An exit post 215 holds down the web to prevent the leakage of air around it that would reduce the level of the vacuum. The supply loop 33 enables rapid intermittent advancement of the web along the glue applying and label affixing stations, without corresponding intermittent rotation of the supply reel 12. A heavy supply reel could not readily be rotated and stopped at the rapid intervals, such as 1,000 per minute, at which labels can be applied by the apparatus of the invention. The supply loop allows for starting and stopping of the supply reel rotation at much less frequent intervals. The vacuum drawing of the web into the supply loop 33 also serves to provide a constant drag to the web to hold it taut at annular frame portion 50 where the gluing and affixing stations are located. The loop 33 of web and curtain 207 are of very low mass so that their sudden acceleration toward the gluing station does not require a large web tension that might break the web. To further prevent slackness of the web, a drag post 208 is provided which is located down-path from the supply chamber. The drag post supplies a small but definite drag to the web.

Figures 9, 11:
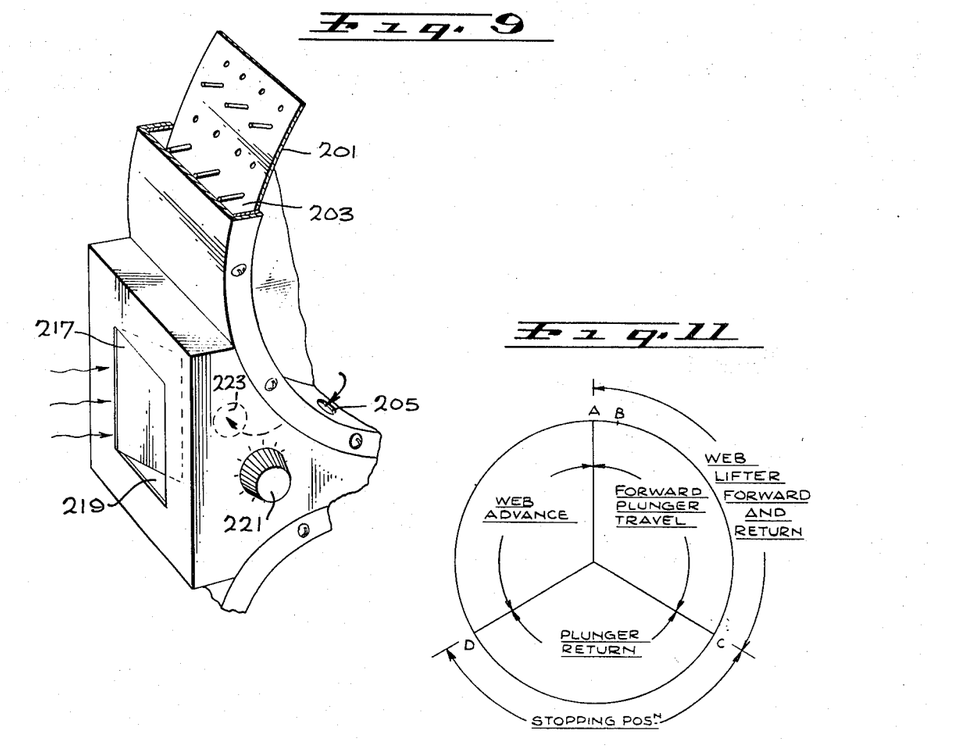
FIG. 9 is a perspective view of the damping apparatus of FIG. 8.
FIG. 11 is a representation of the operation cycle of the apparatus of FIG. 1.

When the supply loop 33 is suddenly pulled, so that it moves away from the perforation plate 201, the vacuum may increase to a high level. This is particularly true where the loop 33 is very close to the perforation plate so that the volume between them may readily increase manyfold. To prevent an excessively high vacuum level, a damper door 217, shown in FIG. 9, is provided which can open to admit air that reduces the level of vacuum. The door 217 is spring-biased to close an aperture 219 that leads to the ambient atmosphere. A damper control knob 221 is provided to adjust the spring bias, and therefore to control the maximum vacuum level which can be maintained.

The take-up chamber 56 which is shown in FIG. 1, is constructed in a manner similar to that of the supply chamber. It maintains a take-up loop 57 of the web within a predetermined size range. The take-up apparatus also utilizes a light beam 63 which can shine from a source 65 to a photocell 67, and a curtain held by a post 61 to aid in interrupting the beam.

Figure 10:
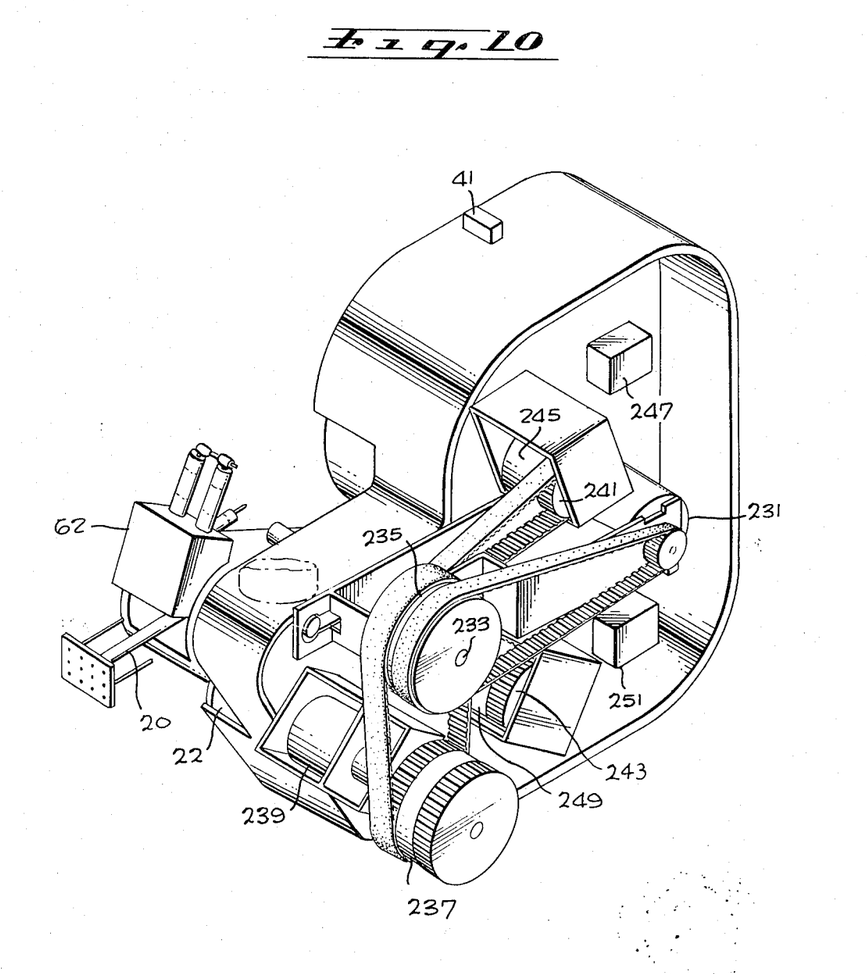
FIG. 10 is a rear perspective view of the labeling apparatus of FIG. 1.

FIG. 10 illustrates the apparatus that drives the supply and take-up reel shafts, and operates the sprocket wheel, glue applying, and label affixing apparatus. A main motor 231 drives a crankshaft 233. A connecting rod (not shown) has one end coupled to the crankshaft 233 and an opposite end coupled to the plunger 20, to reciprocate the plunger. The plunger is mounted so that it extends in front of the plane of the web 10 for 120° of crankshaft rotation, and behind this plane for 240°. The crankshaft 233 also has a pulley 235 that drives a belt to rotate a web drive pulley 237. The pulley 237 drives a geneva mechanism 239 which indexes or advances the sprocket wheel during 120° of each revolution of the crankshaft 233. A group of cams (not shown) is also mounted on the crankshaft 233, to open and close air valves that control the operation of the glue applicator 62 and web lifter, and the vacuum supplied to the plunger 20. Such cam operated mechanisms are well known in the art and therefore have not been illustrated. The timing and sequence of operation of the glue applicator, plunger, and sprocket wheel apparatus will be described below.

The crankshaft 233 also drives belts which are coupled to a supply reel pulley 241 and take-up reel pulley 243. The supply reel pulley 241 drives the supply reel 12 through an electric clutch and brake assembly 245. The clutch and brake assembly 245 are controlled by the output of a photocell amplifier 247, which is connected to the photocell 41. When the supply loop of web in the supply chamber 35 becomes too short, so that the beam 39, the amplifier 247 generates a signal which causes dispredetermined signal to the amplifier 247. The amplifier thereupon engages the clutch in apparatus 245 to unwind the supply reel 12. When the supply reel unwinds sufficiently for the supply loop to again interrupt the beam 39, the amplifier 247 generates a signal which causes disengagement of the clutch and application of the brake in apparatus 245. The reel 12 then stops unwinding.

Enough delay is provided between interruptions of the beam 39 and corresponding cessation of rotation of the supply reel 12 to prevent a too rapid stopping of the supply reel. If desired, apparatus can also be included for varying speed at which the supply reel is rotated in accordance with the diameter of the remaining roll of web.

The take-up reel pulley 243 is coupled to the take-up reel 14 through a clutch and brake apparatus 249. This apparatus is controlled by an amplifier 251 in the same manner as the supply reel apparatus.

The glue application, plunger, and sprocket wheel apparatus are operated in a closely controlled time sequence. FIG. 11 is a diagram which indicates the sequence of operations in one cycle, during which one label is applied to an article, another label is readied for application, and the web is advanced. Between positions A and C on the diagram, the plunger moves through the plane of the web and reaches its most forward position where the label is stuck on the goods. During the same period A to C, the web lifter moves the web to the glue applicator head to apply glue to the preceding label, and withdraws the label from the head. At time B, which is just prior to the instant when the plunger bursts through the web, the web lifter has just moved the web against the applicator head. At time C, the web lifter has completely withdrawn the web from the applicator head.

During the period C to D, the plunger returns from the goods, so that at position D the plunger lies behind the plane of the web. During the period D to A, the sprocket wheel turns to advance the web, so that a new label is over the web lifter opposite the glue applicator head, while the last label to receive glue is over the plunger. A new cycle can then begin, to affix one label and apply glue to the following one.

It is often necessary to stop the machine temporarily, such as during a brief interruption in the flow of goods to be labeled. The sequence defined by FIG. 11 enables the labeling to be continued after an interruption, without the occurrence of a failure to affix a label to the first article thereafter passing by the plunger. The machine is allowed to stop only during the period C to D when the plunger is returning. During this period C to D, the only label with glue on it is a label against the web lifter. The glue on this label is kept at an elevated temperature, and therefore tacky, by reason of its proximity to the heated applicator head. Thus, when the machine is restarted, this label, which is the first to be applied, will stick to the goods.

Figures 12, 13:
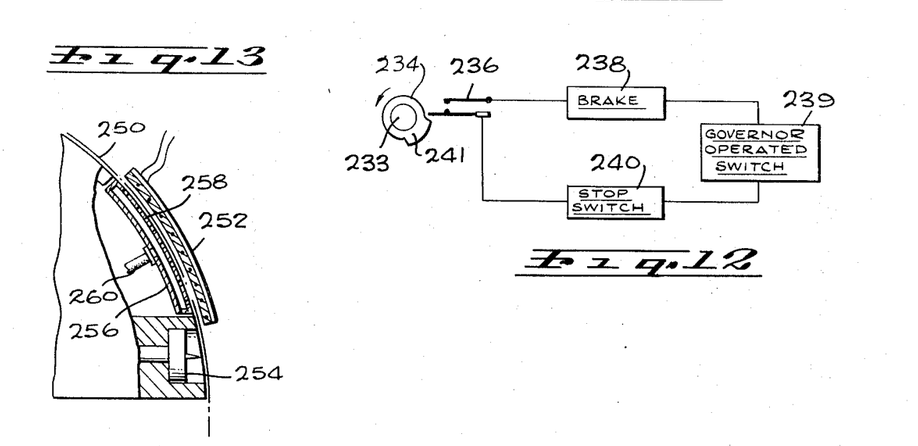
FIG. 12 is a simplified diagram of a mechanism for stopping the labeling apparatus at a particular portion of a cycle.
FIG. 13 is a side elevation view of glue activating apparatus constructed in accordance with another embodiment of the invention.

FIG. 12 is a simplified diagram of apparatus for stopping the machine during the period C to D, comprising a cam 234 mounted on the crankshaft 233. The cam has a protuberance 241 which can close a switch 236 that operates a brake 238. The brake 238 is applied directly to the crankshaft 233 and the sprocket wheel shaft 59 to stop them in less than one-third of a revolution. The brake is connected in series with a governor-operated switch 238 which is closed only when the crankshaft has slowed down to a low speed. It is also in series with a stop switch 240 which is closed only when an on-off switch (not shown) on the machine is operated to the off position. When the machine has been turned off and the crankshaft has slowed down to a relatively slow speed, the brake 238 is operated at the time when the cam protuberance 241 closes switch 236. The protuberance 241 on the cam has a position corresponding to the position C in the diagram of FIG. 11. It causes the brake to stop the cycle before it reaches the position D.

In order to use the labeling apparatus, it is positioned adjacent to a product conveyor which moves goods to be labeled past the plunger 20. The movement of goods by the conveyor apparatus must be synchronized with operation of the labeling machine. Generally, it is necessary to have the goods quickly conveyed in front of the plunger 20 and then stopped momentarily while the plunger applies a label to an item. This can be accomplished by a number of conveyor systems, such as the Star Wheel or Timing Screw types.

A large number of variations of the labeling apparatus may be employed. FIG. 13 illustrates a glue activating apparatus for use with a web 250 which has thermoplastic glue on its rear face. Such a glue is substantially non-tacky until heated. The apparatus includes a heating plate 252 with an electrical heating element that raises the temperature of the thermoplastic glue so that it is tacky. The label area is moved to the plunger 254 or other affixing station and affixed to the goods before the glue can cool. Instead of a web lifter, a stationary vacuum plate 256 is provided to hold the web away from the heating plate 252. The vacuum plate 256 includes a face 258 with several holes which are coupled to a vacuum line 260. Another type of glue activating apparatus suitable for use with glues soluble in water or other solvent, it is a spray for coating the web with the solvent.

The use of heating plates or solvent sprays to activate glue on the web, is generally performed without the use of a web lifter. In such applications, an auxiliary clamp can be provided to replace the web lifter. Such a clamp is useful to hold back the web remnant as a label is punched out by the plunger. An auxiliary clamp may be positioned up-path from the glue activating station to prevent contact with tacky glue.

Figure 14:
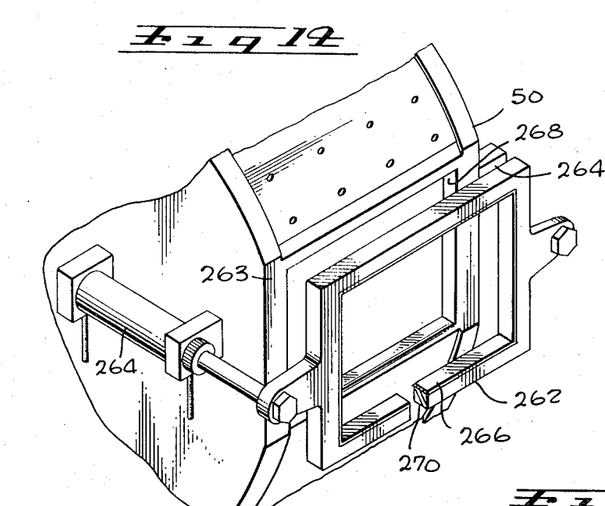
FIG. 14 is a perspective view of apparatus constructed in accordance with still another embodiment of the invention, for cutting label areas from a web wherein the label areas have not been pre-cut.

FIG. 14 illustrates an embodiment of the invention for use with a web having label areas which have not been pre-cut from the surrounding web. The apparatus comprises a clamping frame 262 which is moved by a pair of air cylinders 264 toward and away from the annular frame portion 50. A border 263 which serves as a die, defines the opening 268 through which the plunger moves. The opening 268 is in the shape of the labels to be cut out. The clamping frame includes an outer frame plate 270 which clamps the web against the border 263, and a cutting blade portion 266 which cuts out the label areas. The plunger, which is slightly smaller than the open area within the cutting blade portion 266, moves through the web and applies the cut-out label to the goods. After return of the plunger and movement of the clamping frame 262 away from the border 263, the web is advanced. Although the label areas are not pre-cut in the web, the sprocket holes may be preformed, if desired.

Figure 15:
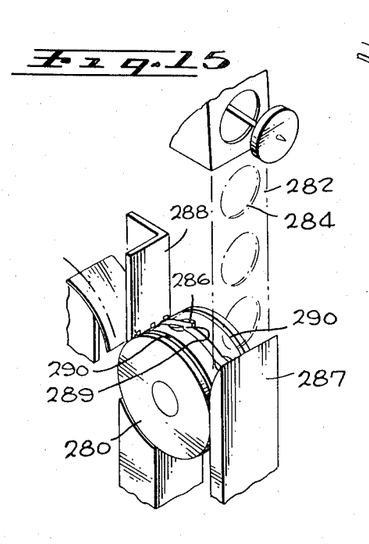
FIG. 15 is a perspective view of apparatus constructed in accordance with yet another embodiment of the invention, wherein the sprocket wheel engages the holes left in the web by reason of the removal of labels therefrom.
Figure 16:
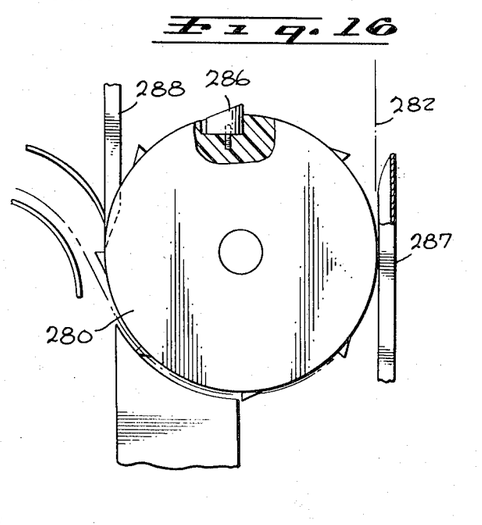
FIG. 16 is a side elevation view of the apparatus of FIG. 15.

As has been earlier noted, it is necessary to maintain close control of the web advancement at each cycle. However, instead of employing sprocket holes or other special indexing means along the web waste, the holes left by the label areas can be used. FIGS. 15 and 16 illustrate a sprocket wheel 280 which is adapted for use with a web 282 which has round label areas that leave round holes 284 in the web remnant. The sprockets 286 in the sprocket wheel are formed for engagement with the holes 284 left in the web remnant. A collector 287 is provided which has a pair of elements on either side of the sprockets and another which extends into grooves 289 in the sprockets, to force the web remnant into engagement with the sprockets. A plow 288 is positioned at the location where the web remnant leaves the sprocket wheel, to wedge it off. The plow 288 includes three fingers that extend into three grooves 290 in the sprocket wheel at either edge and at the center, to remove the web remnant. The web remnant can then be wound on the take-up reel for disposal, in the same manner as the web remnants described above. This embodiment of the invention can be employed with a wide variety of label shapes by the use of appropriately shaped sprockets.

There has been described hereinabove a novel, useful and unique labeling apparatus suitable for high speed operation, flexible in its ability to handle labels of different sizes and shapes and relatively inexpensive in cost. Although particular embodiments of the invention have been described and illustrated herein, it is recognized that modifications and variations may readily occur to those skilled in the art, and, consequently, it is intended that the claims be interpreted to cover such modifications and equivalents.

What is claimed is:
1. Apparatus for applying labels from a label supply comprising partially precut labels supported along an elongated web, to goods carried past said apparatus comprising:
   means defining a web path;
   means for advancing said web intermittently along said path;
   means disposed along said path for establishing a tacky surface on one face of said web at said labels thereof, at times when said web is substantially stationary; and
   means positioned downpath from said tacky surface applying means for detaching said label areas from said web and affixing them to said goods;
   said tacky surface applying means comprising an applicator having an applicator head with two sides one of which faces a first side of said web to engage and apply glue thereto, said applicator head being constructed of a porous material to allow glue to flow therethrough from one side to said side facing said web.

2. The apparatus described in claim 1 wherein:
   said applicator includes heating means for applying heat to said applicator head, whereby to allow glue to readily flow through it.

3. The apparatus described in claim 1 wherein said tacky surface applying means comprises:

means positioned opposite said head for clamping said web between it and said head;

means for moving said head and said means positioned opposite said head toward and away from each other; and means for forcing glue through said head substantially during the time when said head and means positioned opposite said head are together.

4. The apparatus described in claim 3 wherein:

said means positioned opposite said head comprises means defining a surface having at least one hole in it, and vacuum means coupled to said hole for applying a partial pressure to it to draw said web against said surface.

5. The apparatus described in claim 3 wherein:

said means for detaching comprises a plunger and means for passing said plunger through said web substantially at the time said glue applicator head and said means opposite said head are together, whereby to clamp said web as said plunger passes through it.

6. Apparatus for applying labels defined along an elongated web, to goods carried past said apparatus comprising:

means defining a web path;

means for advancing said web intermittently along said path;

means disposed along said path for establishing a tacky surface on one face of said web at said label areas thereof, at times when said web is substantially stationary;

means positioned downpath from said tacky surface applying means for detaching said label areas from said web and affixing them to said goods;

said means for detaching comprising a plunger having a pin for piercing a label area of said web, means for thrusting said plunger through said web and toward said goods with said pin extended, and means for retracting said pin prior to the affixing of said label area to said goods.

7. Apparatus for applying partially precut labels supported within an elongated web, to goods carried past said apparatus comprising:

means defining a web path;

means for advancing said web intermittently along said path;

means disposed along said path for establishing a tacky surface on one face of said web at said label areas thereof, at times when said web is substantially stationary; and means positioned downpath from said tacky surface applying means for detaching said label areas from said web and affixing them to said goods, said means for detaching comprising a plunger having a face with at least one opening in it, and vacuum means for applying a partial pressure to said opening to hold a label area to said plunger when said label is detached from said web.

8. Apparatus for applying labels defined along an elongated web, to goods carried past said apparatus comprising:

means defining a web path;

means for advancing said web intermittently along said path;

means disposed along said path for establishing a tacky surface on one face of said web at said label areas thereof, at times when said web is substantially stationary;

means positioned downpath from said tacky surface applying means for detaching said label areas from said web and affixing them to said goods;

said web including sprocket areas spaced along the length of said web;

said means for advancing comprising a sprocket wheel positioned downpath from said plunger means, said sprocket wheel having a plurality of sprockets for engaging said sprocket areas;

collector means positioned at an area where said sprockets engage said sprocket areas, including means disposed on either side of said sprockets for pressing said web toward said sprocket wheel; and a plow positioned at an area where said web leaves said sprocket wheel, including plow fingers located beside said sprockets for wedging said web from said sprockets.

9. Apparatus for applying labels of varying shapes and sizes from a prepared label supply to products wherein the label supply includes a prepared elongated web comprising a web remnant supporting a plurality of precut labels throughout its operating length, the apparatus comprising:

means for establishing a tacky surface to labels within the web, and reciprocating plunger means for passing through said web, for detaching a label from said web when the web is substantially stationary and for applying said detached label to one of said products, said plunger means including vacuum means for holding said detached label on said plunger from the time when the plunger engages the label until the time when the label is applied to the product.

10. Apparatus for applying labels of varying shapes and sizes from a prepared label supply to a product wherein the label supply includes a prepared elongated web comprising a web remnant supporting a plurality of precut removable labels throughout its operable length, and wherein said apparatus is of the type which generally includes means for establishing a tacky surface to labels within the web, the improvement comprising:

resilient reciprocating plunger means for passing through said web, for engaging and detaching a label from said web when the web is substantially stationary and for applying said label to a product, and means for holding said web remnant stationary during removal of a label therefrom.

11. Apparatus for applying to products precut labels removably supported within an elongated web comprising, means for establishing a tacky surface on labels within the web at a station, a resilient reciprocating plunger means at a succeeding station, means for actuating the resilient reciprocating plunger means through the plane of the web to detach a removable precut label from the web, to carry the label to a product, and to apply a label to the product, and means for advancing the web to successive stations and for holding the web while a label is being removed therefrom.

12. Apparatus for applying to products precut labels removably supported within an elongated web comprising, means for establishing a tacky surface on labels within the web at a station, a reciprocating plunger means at a succeeding station, vacuum means for holding a label on said plunger means, means for actuating the reciprocating plunger means through the plane of the web to detach a label from the web, to carry the label to a product, and to apply the detached label to a product, and means for advancing the web to successive stations and for holding the web while a label is being removed therefrom.

13. Apparatus for applying to objects precut labels supported within an elongated web comprising, means for establishing a tacky surface on labels within the web at a station, a reciprocating plunger means at a succeeding station, said plunger means having a free end, and a resilient material mounted on said free end, means for actuating the reciprocating plunger means to drive its free end and said resilient material through the plane of the web to engage and detach a label from the web, to carry the label to an object, and to apply the label to the object, and means for advancing the web to successive stations and for holding the web while a label is being removed therefrom by said resilient material.

14. Apparatus as in claim 12 wherein said plunger means has a free end and including resilient means mounted on said free end for engaging and detaching said label from said web and for applying said label to a product.

15. Apparatus as in claim 13 including means for holding said label on said resilient means prior to application of said label to said product.

16. Apparatus for applying labels to products comprising,
- a precut label supply including an elongated web supporting a plurality of detachable die-cut labels throughout its length,
- means for establishing a tacky surface on labels within the web at a station,
- a reciprocating plunger means at a succeeding station,
- means for actuating the reciprocating plunger means to drive it through the plane of the web to detach a label from the web, to carry the label to a product, and to apply a label to the product, and
- means for advancing the web to successive stations and for holding the web while a label is being removed therefrom.

17. Apparatus as in claim 16 wherein said reciprocating plunger has a free end for engaging a detachable label and wherein said free end includes a resilient material thereon for engaging and detaching a label and for applying the label to a product.

18. Apparatus as in claim 17 including vacuum means for holding a label on said resilient material for a predetermined time.

19. Apparatus for applying, in one step, labels of varying shapes and sizes from a prepared label supply to objects wherein the label supply includes a prepared elongated web comprising a web remnant supporting a plurality of partially precut removable labels throughout its operable length, said apparatus comprising:
- means for establishing a tacky surface to labels within the web at a station,
- a reciprocating plunger means for passing through said web and engaging and detaching, at another station, a label from said web when the web is substantially stationary, for transferring the detached label from said other station toward an object, and for applying said label to the object,
- said plunger means having a free end,
- a resilient label engaging material mounted on said free end of said plunger for engaging, detaching and applying labels,
- means for actuating said plunger means to drive said resilient material through said web to engage and detach a label from the web, to carry the label to an object, to apply the label to the object, and then to withdraw said resilient material from the object and through the web,
- vacuum means for holding a label on said resilient label engaging material for a predetermined period from a time when said resilient material engages a label until a time when the label is applied to an object,
- means for advancing the web from station to station within the apparatus, and
- means for holding the web remnant stationary during removal of a label therefrom.

References Cited
UNITED STATES PATENTS

| | | | |
|---|---|---|---|
| 1,393,581 | 10/1921 | Sells | 156—518 X |
| 1,968,881 | 8/1934 | Edwards | 156—518 |
| 1,986,611 | 1/1935 | Thomsen | 156—518 X |
| 2,264,339 | 12/1941 | Sherman | 156—261 X |
| 2,922,192 | 1/1960 | Morin | 156—518 X |
| 2,988,967 | 6/1961 | Dudnick et al. | 156—261 X |
| 3,178,329 | 4/1965 | Roltbogner | 156—250 |
| 3,193,430 | 7/1965 | Messmer et al. | 156—578 X |
| 3,506,524 | 4/1970 | Von Hofe et al. | 156—578 X |
| 3,565,724 | 2/1971 | Yamaguchi | 156—521 X |
| 2,232,729 | 2/1941 | Randolph | 156—493 |
| 3,159,522 | 12/1964 | Schmidt | 156—444 |

HAROLD ANSHER, Primary Examiner

U.S. Cl. X.R.

156—261, 521, 528, 529

UNITED STATES PATENT OFFICE
CERTIFICATE OF CORRECTION

Patent No. 3,776,801  Dated December 4, 1973

Inventor(s) Herbert LaMers

It is certified that error appears in the above-identified patent and that said Letters Patent are hereby corrected as shown below:

Column 2, line 19, "carrier" should be --carries--

Column 3, lines 46, 47 and 48 "has been formed. A vacuum is maintained on the side of the loop 33" should be omitted Column 7, line 69, "exceesively" should be --excessively--

Column 8, line 39, after "39" delete lines 39, 40, 41, 42, 43, 44, 45 and 46

Column 8, line 39, after "39" insert --is no longer interrupted, the photocell 41 delivers a predetermined signal to the amplifier 247. The amplifier thereupon engages the clutch in apparatus 245 to unwind the supply reel 12. When the supply reel unwinds sufficiently for the supply loop to again interrupt the beam 39, the amplifier 247 generates a signal which causes disengagement of the clutch and application of the brake in apparatus 245. The reel 12 then stops unwinding.--

Column 9, line 27 "238" should be --239--

Column 9, line 62, before "is" delete "it"

Signed and sealed this 4th day of June 1974.

(SEAL)
Attest:

EDWARD M. FLETCHER, JR.
Attesting Officer

C. MARSHALL DANN
Commissioner of Patents